(12) United States Patent
Braines et al.

(10) Patent No.: US 8,489,631 B2
(45) Date of Patent: Jul. 16, 2013

(54) DISTRIBUTING A QUERY

(75) Inventors: Dave Braines, Hursley (GB); Gareth E. Jones, Hursley (GB)

(73) Assignee: International Business Machines Corporation, Armonk, NY (US)

(*) Notice: Subject to any disclaimer, the term of this patent is extended or adjusted under 35 U.S.C. 154(b) by 461 days.

(21) Appl. No.: 12/771,313

(22) Filed: Apr. 30, 2010

(65) Prior Publication Data
US 2010/0281053 A1 Nov. 4, 2010

(30) Foreign Application Priority Data
May 1, 2009 (EP) .................................. 09159267

(51) Int. Cl.
*G06F 17/30* (2006.01)
(52) U.S. Cl.
USPC ............................................................ 707/770
(58) Field of Classification Search
USPC ............................................................ 707/770
See application file for complete search history.

(56) References Cited

U.S. PATENT DOCUMENTS

| | | | |
|---|---|---|---|
| 7,818,352 B2 * | 10/2010 | Krishnamoorthy et al. | 707/803 |
| 2006/0235823 A1 * | 10/2006 | Chong et al. | 707/1 |
| 2007/0016587 A1 | 1/2007 | Ranger et al. | |
| 2007/0038610 A1 * | 2/2007 | Omoigui | 707/3 |
| 2008/0313134 A1 * | 12/2008 | Lei | 707/2 |
| 2009/0006447 A1 * | 1/2009 | Balmin et al. | 707/102 |

OTHER PUBLICATIONS

"SWAP: ontology-based knowledge management with peer-to-peer technology" Ehrig, M. et al in Proceedings of the second Konferenz Professionelles Wissensmanagement, Lucerne Apr. 2-4, 2003. http://www.aifb.uni-karlsruhe.de/WBS/cle/html/publications/pdf/ehrig03swapb_wiamis03.pdf.

"Efficient query routing in RDF/S schema-based P2P systems" Sidirourgos, L. et al in Fourth Hellenic Data Management Symposium (HDMS'05), Athens Aug. 25-26, 2005. http://www.ics.forth.gr/isl/publications/paperlink/indexviews.pdf.

\* cited by examiner

*Primary Examiner* — Wilson Lee
*Assistant Examiner* — Thuy Bui
(74) *Attorney, Agent, or Firm* — DeLizio Gilliam, PLLC

(57) ABSTRACT

A method for distributing a query, wherein the query comprises one or more sub-clauses, wherein each sub-clause comprises a triple pattern having three components for use with a distributed system, the method comprising the steps of: identifying each sub-clause; analyzing three components of each sub-clause in accordance with one or more analysis rules in order to determine the proportion of values to variables; in response to the determination, testing the sub-clause against one or more execution rules, wherein the execution rules are associated with an order of processing of a sub-clause based on the proportion of values to variables; in response to the testing, generating a sub-query associated with a first sub-clause having the largest proportion of values to variables.

29 Claims, 4 Drawing Sheets

Analysis Rules:

1. *[all_known]* = terms where all three components are already known
2. *[one_var]* = terms where two of the components are already known, and the remaining one component is a variable
3. *[two_vars]* = terms where only one of the components is already known and the remaining two components are variables.
4. *[three_vars]* = terms where none of the components are already known and all three components are variables.
5. *[optional]* = an optional clause
6. *[filter]* = a filter term.
7. [executed] = a term, *[optional]* clause and/or *[filter]* term that has been executed
8. *[not_executed]* = a term, *[optional]* clause and/or *[filter]* term that has not been executed

FIG. 3

Execution rules:

1. The first *[all_known]* term that is *[not_executed]*, or if there are none of these:
2. The first *[one_var]* term that is *[not executed]*, or if there are none of these:
3. The first *[two_vars]* term that is *[not_executed]*, or if there are none of these:
4. The first *[three_vars]* term that is *[not_executed]*.
5. No term, *[optional]* clauses and/or *[filter]* term that is *[executed]* will be executed again.
6. Any *[optional]* clauses are processed after all terms are *[executed]*.
7. Any *[filter]* term is processed after all other terms and *[optional]* clauses are *[executed]*.

FIG. 4

DISTRIBUTING A QUERY

BACKGROUND

1. Technical Field

The present invention relates to a method for distributing a query.

2. Description of Related Art

In a reliable environment with a "closed" data set, a query can be issued wherein the data set is queried in its entirety. In a distributed network environment data is often held in multiple places, and current technologies allow the querying of each data set. However, issues remain regarding how to achieve querying in a distributed network environment using a single query across multiple, separate data sets because in such an environment, the data can have associated inconsistencies (e.g. if the data is stored on multiple nodes, the data may not be stored in its entirety on one of the nodes, giving inconsistent "views" of the data) and access to the data set can be unreliable (e.g. because one or more nodes may not be available).

A current solution to this problem involves pre-configuration of the environment to define the location and structure of the data sets. This is obviously complex, time consuming and may not be possible in a truly distributed environment (e.g. wherein nodes can be owned by different owners; wherein the location of a data set is often not known/cannot be controlled; and wherein the nodes themselves do not know each other).

SUMMARY

According to a first aspect embodiment, there is provided a method for distributing a query, wherein the query comprises one or more sub-clauses, wherein each sub-clause comprises a triple pattern having three components for use with a distributed system, the method comprising identifying each sub-clause; analysing three components of each sub-clause in accordance with one or more analysis rules in order to determine the proportion of values to variables; in response to the determination, testing the sub-clause against one or more execution rules, wherein the execution rules are associated with an order of processing of a sub-clause based on the proportion of values to variables; in response to the testing, generating a sub-query associated with a first sub-clause having the largest proportion of values to variables.

According to additional embodiments of the present invention and a computer program product, there are provided an apparatus and a computer program product for distributing a query, as described herein.

Embodiments of the present invention provide a mechanism for distributing a query across multiple disparate data sets in response to decomposition of the query. Such embodiments allow for real-time discovery of new data based on the data that has been returned in response to a sub-query.

Alternative embodiments provide an apparatus for centrally co-ordinating a query that is sent to nodes in a distributed environment.

BRIEF DESCRIPTION OF THE DRAWINGS

The present invention will now be described, by way of example only, with reference to selected embodiments thereof, as illustrated in the following drawings, wherein:

FIG. 3 is a representation of one or more analysis rules, according to an embodiment of the present invention; and FIG. 4 is a representation of one or more execution rules according to an embodiment of the present invention.

DETAILED DESCRIPTION OF AN ILLUSTRATIVE EMBODIMENT

Figure 1:
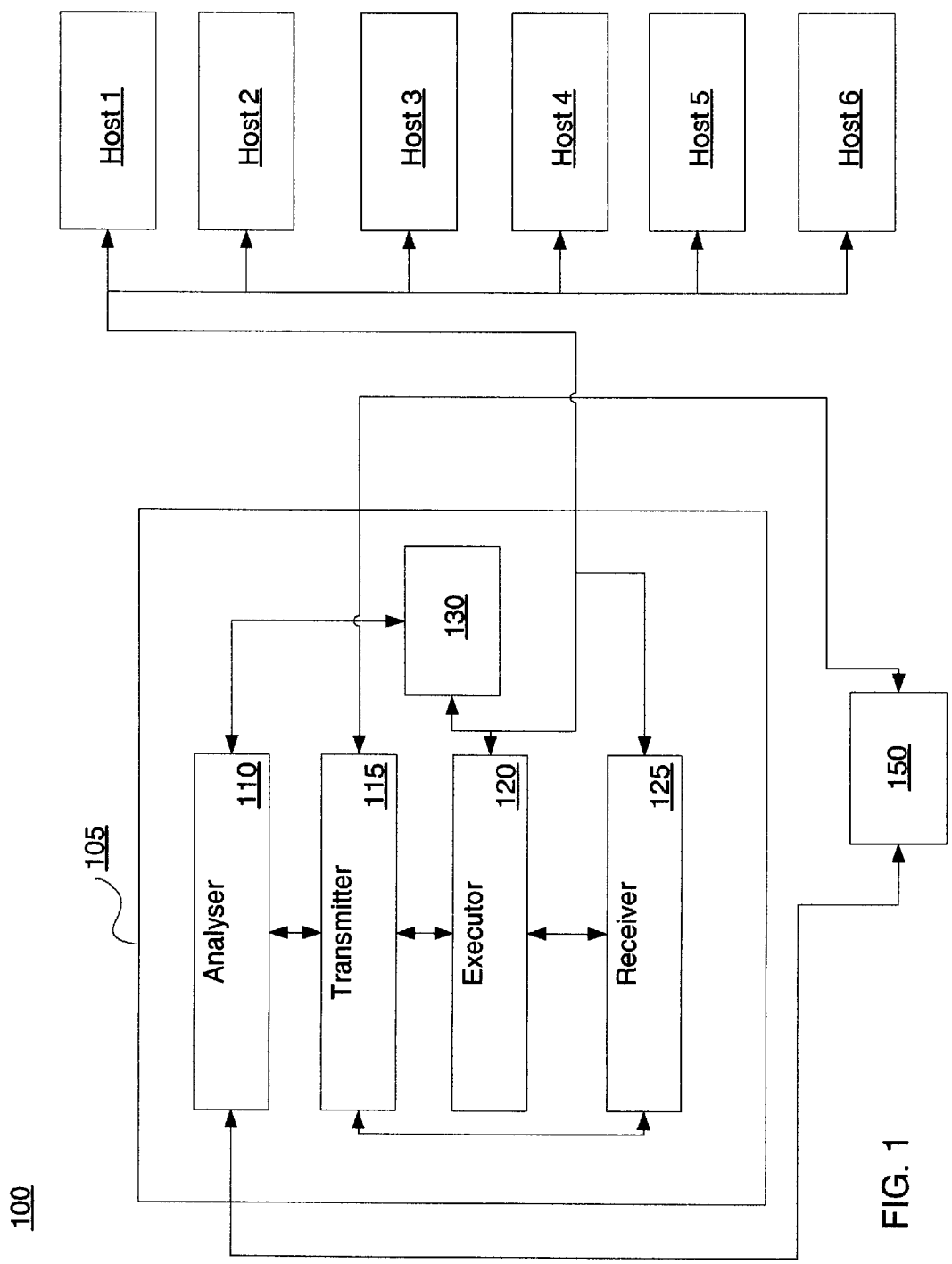
FIG. 1 is a block diagram of a system according to an embodiment of the present invention.

An environment, contemplated by the inventors of the present application, in which one or more embodiments of the present invention are operable, will now be described.

Environments such as the Semantic Web extend the World Wide Web wherein a representation of the "meaning" of data is emphasised. A more recent, emergent, approach to providing semantic content for the World Wide Web is that of the Linked Data Web which advocates semantic mark-up of data on the World Wide Web using for example, RDF (Resource Description Framework). Preferably, the environment in which embodiments of the present invention can be implemented provide semantic data.

Furthermore, the environment (e.g. a distributed system) in which embodiments of the present invention can be implemented can be unreliable. For example, nodes within the environment can be heterogeneous; owned by different owners and have unreliable availability. This will be discussed in more detail below.

Typically, the Semantic Web and the Linked Data Web express data in the form of triples. A triple comprises three components, namely, a "subject"; a "predicate" and an "object". Each of the components comprises a value—preferably, the value can be: a non-literal value (e.g. a URI (Uniform Resource Identifier)) or a literal value (e.g. an absolute value such as a string (e.g. "John") or a number (e.g. "42")).

Conceptually, a triple can be read as an entity (a "subject") having a relationship (a "predicate") with a value (an "object").

Triples can be stored in a repository known as a triple store and can be accessed/queried using an interface (e.g. "SPARQL" query language). At a conceptual level, a triple store can be considered to be the equivalent of a single table with three columns (representing a subject, a predicate and an object) and a row for every unique triple that is stored.

The environment in which the described embodiment is implemented makes use of the Linked Data Web concept that advocates that URIs should be dereferencable, that is, that in addition to their uniqueness, URIs should also be able to be requested (using a query) and in response to the query, a "meaningful" response is returned. This allows for subsequent processing using the response. For example, a URI of "12345" cannot be used in subsequent processing because, although the URI is unique, it cannot be used in a subsequent query to obtain more data. However, a URI comprising a URL (Uniform Resource Locator) can be used in subsequent processing as a subsequent query can be sent to the location associated with the URL in order to obtain more data.

Preferably, data can be stored at multiple nodes in the distributed system. For example, in one embodiment a triple can be stored in up to three nodes in the system if the triple comprises three components each of which is associated with a dereferencable URI comprising a URL and wherein each URL is associated with a different node—in this case, the triple is associated with each URL. This is advantageous as it provides a degree of redundancy for data which is useful in a potentially unreliable network environment.

It should be understood that a node may or may not store a triple—e.g. based on contextual information such as the specific URI involved—consequently, a query issued to a node in the system may not return consistent data compared with a query issued to another node in the system.

A distributed system (100) in which the illustrated embodiment can be implemented is shown in FIG. 1. Preferably, the distributed system (100) is a web environment and preferably, a URI comprises a URL.

An apparatus (105) of the illustrated embodiment comprises an analyser (110) and an executor (120) each operable to access a set of rules (130); a transmitter (115) and a receiver (125). Apparatus (105) is operable to communicate with one or more nodes (Host 1; Host 2; Host 3; Host 4; Host 5 and Host 6) using a network. Apparatus (105) is also operable to communicate with an application (150).

Figure 2:
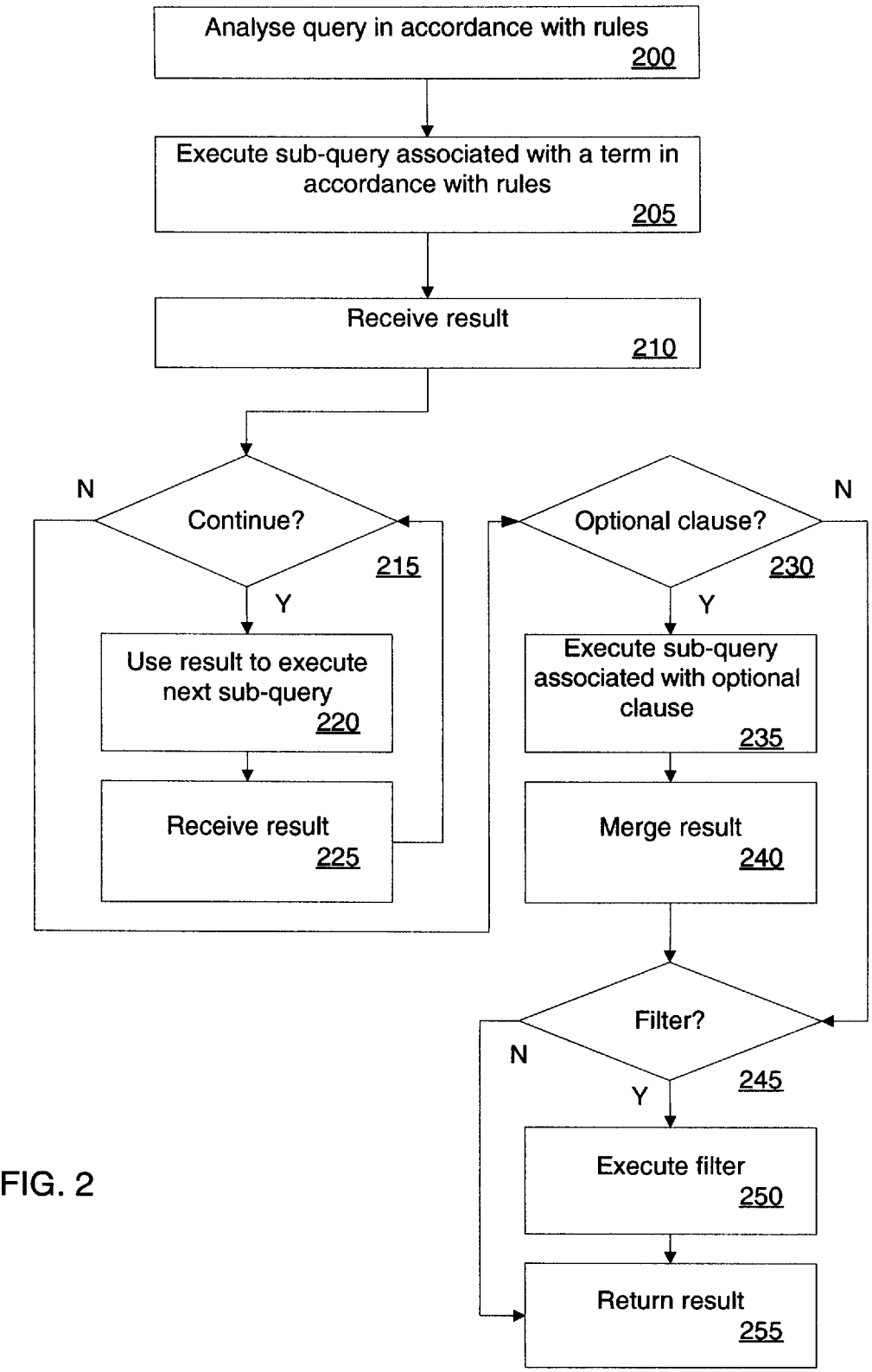
FIG. 2 is a flow chart showing operation of a process according to an embodiment of the present invention.

With reference to FIG. 2, a query, received for example by receiver (125) from application (150) is analyzed (process block 200). Such analysis may be performed by analyzer 110 of FIG. 1.

In an example, a SPARQL query is analysed and a representation of a SPARQL query is shown below. The query comprises a "SELECT" clause and a "WHERE" clause further comprising a number of sub-clauses. It should be understood that the syntax of the query is for illustrative purposes only. Embodiments of the present invention can function with other forms of SPARQL query e.g. "CONSTRUCT"; "ASK" and "DESCRIBE":

---
Query:
---
```
SELECT *
    WHERE
    {
        ?p1 <http://host6/person_spec/name> "John"
        ?p1 <http://host6/person_spec/knows> ?p2
        ?p2 <http://host6/person_spec/knows> ?p3
        FILTER (?p3 != ?p1)
    }
```
---

The depicted query results in the selection of all records which match one or more terms (sub-clauses)—wherein a first term (identified as [1]) comprises "?p1 http://host6/person_spec/name "John""; a second term (identified as [2]) comprises "?p1 http://host6/person_spec/knows ?p2" and a third term (identified as [3]) comprises "?p2 http://host6/person_spec/knows ?p3".

In other words, the query selects records associated with a person ("?p1") having a name "John". The query also selects records associated with another person ("?p2"), wherein the person having name "John" knows the another person ("?p2"). The query also selects records associated with yet another person ("?p3"), wherein the another person ("?p2") knows the yet another person ("?p3").

Thus, the yet another person ("?p3") is known to the another person ("?p2") known by the person ("?p1") having a name "John".

Each term comprises a triple pattern having three "components". Values associated with the three components in entirety represent a fact.

The first term comprises three components, namely, "?p1" (a variable representing an subject); "http://host6/person_spec/name" (a non-literal value (URL) representing a predicate that represents a relationship between a subject and an object) and 'John' (a literal value representing a object).

The second term comprises three components, namely, "?p1" (a variable representing a subject); "http://host6/person_spec/knows" (a non-literal value (URL) representing a predicate that represents a relationship between a subject and an object) and "?p2" (a variable representing an object).

The third term comprises three components, namely, "?p2" (a variable representing a subject); "http://host6/person_spec/knows" (a non-literal value (URL) representing a predicate that represents a relationship between a subject and an object) and "?p3" (a variable representing an object).

The example query above also comprises a further sub-clause known as a filter term, namely "FILTER (?p3 !=?p1)" (identified as [f1]). Execution of the filter term results in the filtering out of records such that the value of variable "?p3" should not be equal to the value of variable "?p1".

In the example, data is stored on one or more nodes (e.g., Host 1; Host 2; Host 3; Host 4, Host 5 and Host 6) and comprises:

| Subject | Predicate | Object |
|---|---|---|
| Data 1: | | |
| http://host1/people/John | http://host6/person_spec/name | "John" |
| http://host1/people/John | http://host6/person_spec/knows | http://host2/people/Alice |
| http://host1/people/John | http://host6/person_spec/knows | http://host3/people/Bob |
| Data 2: | | |
| http://host2/people/Alice | http://host6/person_spec/name | "Alice" |
| http://host2/people/Alice | http://host6/person_spec/knows | http://host4/people/Charles |
| http://host2/people/Alice | http://host6/person_spec/knows | http://host1/people/John |
| Data 3: | | |
| http://host3/people/Bob | http://host6/person_spec/name | "Bob" |
| http://host3/people/Bob | http://host6/person_spec/knows | http://host5/people/Debbie |
| http://host3/people/Bob | http://host6/person_spec/knows | http://host1/people/John |
| Data 4: | | |
| http://host4/people/Charles | http://host6/person_spec/name | "Charles" |
| Data 5: | | |
| http://host5/people/Debbie | http://host6/person_spec/name | "Debbie" |

In the embodiment illustrated in FIG. 2 the query is analyzed with one more analysis rules (130) shown in FIG. 3. It should be understood that such analysis rules are for illustrative purposes only.

Analyser (110) parses the query to identify one or more terms and for each term, the proportion of values to variables that are present.

Analyser (110) also parses the query to identify any optional clauses (wherein an optional clause is a further sub-clause) and filter terms.

Analyser (110) further parses the query to determine whether at least one of: a term, optional clause, and filter term has been executed.

Prior to processing, any term, optional clause, and/or filter term is identified as [not_executed].

In accordance with analysis rules (130), analyser (110) determines the first term as [one_var] (i.e. "?p1") and [not_executed]; the second term as [two_vars] (i.e. "?p1" and "?p2") and [not_executed]; the third term as [two_vars] (i.e. "?p2" and "?p3") and [not_executed] and the filter term as [filter] and [not_executed].

Executor (120) processes a sub-clause in accordance with one or more execution rules (130) shown in FIG. 4. It should be understood that the execution rules are for illustrative purposes only.

Execution rules (130) are associated with an "order" of processing the sub-clauses. Importantly, the order allows for sub-queries to be executed in an order which reduces the likelihood of data not being returned e.g. by executing sub-queries associated with terms having a larger proportion of known values first.

Executing sub-queries associated with terms having a larger proportion of known values first is described with reference to the following example—in the query above, a sub-query associated with term [2] is executed first (before term [1] is executed) and data is returned such that "?p1" has the value "http://host7/people/Jane". That is, data wherein "?p1" has the value "http://host1/people/John" is not returned. This may be because the node that holds the data wherein "?p1" has the value "http://host1/people/John" is not available. Following the example through, if a sub-query associated with term [1] is subsequently executed, it will not return any data because the value of "?p1" has the value "http://host7/people/Jane" and not "http://host1/people/John". In other words, "http://host7/people/Jane" does not meet the triple pattern associated with term [1], namely, "?p1 http://host6/person_spec/name "John"".

Thus, the first four rules depicted in FIG. 4 are associated with executing sub-queries of terms having a larger proportion of known values first. It should be also noted that executor (120) processes each term by executing a sub-query against each non-literal value (comprising a URL) of a component in the term. This is because the URL specifies a location (meaningful data) to which a sub-query can be transmitted. In response to receiving a result associated with execution of the sub-query, executor (120) executes a subsequent sub-query against each non-literal value (comprising a URL) of a component in the result. Note that different URLs (non literal values) associated with a component can be returned in the result. The described embodiment makes use of a URL returned in the result as the URL specifies a location to which a subsequent sub-query can be transmitted.

The fifth rule ensures that a sub-query associated with a sub-clause that has been executed is not executed again.

The sixth rule applies to an optional clause which is executed after all terms have been executed so that the optional clause is executed after all of the data resulting from execution of sub-queries associated with the terms has been returned. This reduces the likelihood of data not being returned.

The seventh rule applies to a filter term, which is executed locally after all terms and optional clauses have been executed so that the filter term is executed on all of the data that has been returned. This reduces the likelihood of data not being returned. With reference to the example query, executor (120) tests each of the sub-clauses against execution rules (130) in order to execute a sub-query associated with a sub-clause that meets a rule highest in the rule order.

In the example herein, executor (120) determines that a sub-query associated with term [1] can be executed first of all as term [1] does not meet the requirements of Rule 1 but does meet the requirement of Rule 2 (in that term [1] is [one_var] and [not_executed]) and Rule 2 is subsequent to Rule 1 in the order.

Executor (120) carries forward terms [2] and [3] as they are [two_vars].

Executor (120) generates and executes a first sub-query associated with term [1] (process block 205). In more detail, executor (120) sends the first sub-query to one or more URLs in term [1]—in this example, to a URL (namely, "http://host6/person_spec/name") associated with the predicate.

Note that the first sub-query cannot be sent to the variable "?p1" representing the subject as it does not have an associated value at all and the first sub-query cannot be sent to the value (i.e. a string, namely, "John") representing the object because it has no associated location.

The example first sub-query below uses the HTTP Protocol to query "http://host6/person_spec/name" for any triples where "http://host6/person_spec/name" is the predicate and the object is "John". It should be understood that the syntax of the first sub-query is for illustrative purposes only:

Sub-Query 1:
HTTP GET http://host6/person_spec/name?o="John"&p=http://host6/person_spec/name In response to execution of the first sub-query, data in the form of a triple is returned (see "Data 1" above) which receiver (125) receives (process block 210):

| Result returned 1: | | |
| --- | --- | --- |
| Subject | Predicate | Object |
| http://host1/people/John | http://host6/person_spec/name | "John" |

Receiver (125) passes the data to executor (120) which assigns the value associated with the "Subject" of the returned triple to variable "?p1", giving a working result set as follows:

| Working Result 1: | | |
| --- | --- | --- |
| ?p1 | ?p2 | ?p3 |
| http://host1/people/John | | |

In response to executing the first sub-query, executor (120) marks term [1] as [executed].

Note that the variable "?p1" is also present in term [2].

As executor (120) determines that there are further terms to be executed (positive result at process block 215), executor (120) tests each of the terms against execution rules (130).

Executor (120) determines that a sub-query associated with term [2] can be executed next as term [2] does not meet the requirements of Rule 1 but does meet the requirement of Rule 2 (in that term [2] is now [one_var] (i.e. a value for "?p2" is not known but a value for "?p1" is now known)) and [not_executed]) and Rule 2 is subsequent to Rule 1 in the order.

Executor (120) carries term [3] forward as it is [two_vars].

Executor (120) uses the Working Result 1 returned in response to execution of the first sub-query to "seed" a subsequent sub-query.

In more detail, executor (120) generates and executes one or more sub-queries (which are effectively the same as each other) associated with term [2]. Executor (120) sends a sub-query to one or more URLs in term [2]—in this example, to a URL (namely, "http://host1/people/John", which was returned in Working Result 1) associated with the subject and to a URL (namely, "http://host6/person_spec/knows") associated with the predicate. A representation of term [2] is shown below:
http://host1/people/John http://host6/person_spec/knows ?p2

In the example, an example second sub-query below uses the HTTP Protocol to query "http://host1/people/John" for any triples where "http://host1/people/John" is the subject and "http://host6/person_spec/knows" is the predicate. It should be understood that the syntax of the second sub-query is for illustrative purposes only:
Sub-Query 2:
HTTP GET http://host1/people/John?p=http://host6/person_spec/knows&s=http://host1/people/John In the example, an example third sub-query below uses the HTTP Protocol to query "http://host6/person_spec/knows" for any triples where "http://host6/person_spec/knows" is the predicate and "http://host1/people/John" is the subject. It should be understood that the syntax of the third sub-query is for illustrative purposes only:
Sub-Query 3:
HTTP GET
http://host6/person_spec/knows?s=http://host1/people/John&p=http://host6/person_spec/knows As described above, it should be understood that stored data can be inconsistent at one node compared with another node e.g. data can be missing such that different data can be returned in response to sub-queries. Furthermore, one or more nodes can be unavailable at query time. Furthermore, a node can decide whether or not to store data. Furthermore, the described embodiment allows for a triple can be stored in up to three nodes in the system. Advantageously, by sending the same sub-query to multiple components (each component associated with storing the associated triple) having a URL in the term, the described embodiment mitigates against the unreliable environment.

Furthermore, with reference to Rule 5, executor (120) ignores term [1] as it is now [executed].

In the example, in response to execution of the second and third sub-queries, data in the form of triples is returned (see "Data 2" and "Data 3" above) which receiver (125) receives (process block 225):

Receiver (125) passes the data to executor (120) which assigns each of the values associated with the "Object" of the returned triples to variable "?p2".

It should be understood that the superset of returned values in response to execution of each sub-query associated with a term is considered the single result associated with the term. Furthermore, where an existing value is known for a variable, the intersection of the existing value and a value returned in response to execution of a subsequent sub-query is stored against the variable. Thus in the example, the working result set is as follows:

| Working Result 2: | | |
| --- | --- | --- |
| ?p1 | ?p2 | ?p3 |
| http://host1/people/John | http://host2/people/Alice | |
| http://host1/people/John | http://host3/people/Bob | |

In response to executing the second and third sub-queries, executor (120) marks term [2] as [executed].

Note that the variable "?p2" is also present in term [3].

As executor (120) determines that there are further terms to be executed (positive result at process block 215), executor (120) tests each of the terms against execution rules (130).

Executor (120) determines that a sub-query associated with term [3] can be executed next as term [3] does not meet the requirements of Rule 1 but does meet the requirement of Rule 2 (in that term [3] is now [one_var] (i.e. a value for "?p3" is not known but a value for "?p2" is now known)) and [not_executed]) and Rule 2 is subsequent to Rule 1 in the order.

Executor (120) uses the Working Result 2 returned in response to execution of the second and third sub-queries to "seed" a subsequent sub-query.

In more detail, executor (120) generates and executes one or more sub-queries (which are effectively the same as each other) associated with term [3].

Note, however, that the Working Result 2 comprises two non-literal values for the variable "?p2".

Thus, with reference to the Working Result 2, version 1 of term [3] is as follows:
http://host2/people/Alice http://host6/person_spec/knows ?p3

Furthermore, with reference to the Working Result 2, version 2 of term [3] is as follows:
http://host3/people/Bob http://host6/person_spec/knows ?p3

Thus, executor (120) generates and executes one or more sub-queries (process block 220) (which are effectively the same as each other) associated with version 1 of term [3]. Executor (120) sends a sub-query to one or more URLs in

| Result returned 2: | | |
| --- | --- | --- |
| Subject | Predicate | Object |
| http://host1/people/John | http://host6/person_spec/knows | http://host2/people/Alice |
| http://host1/people/John | http://host6/person_spec/knows | http://host3/people/Bob | version 1 term [3]—in this example, to a URL (namely, "http://host2/people/Alice", which was returned in Working Result 2) associated with the subject and to a URL (namely, "http://host6/person_spec/knows") associated with the predicate.

In the example, an example fourth-query below uses the HTTP Protocol to query "http://host2/people/Alice" for any triples where "http://host2/people/Alice" is the subject and "http://host6/person_spec/knows" is the predicate. It should be understood that the syntax of the fourth sub-query is for illustrative purposes only:

Sub-Query 4:

HTTP GET http://host2/people/Alice?p=http://host6/person_spec/knows&s=http://host2/people/Alice In the example, an example fifth sub-query below uses the HTTP Protocol to query "http://host6/person_spec/knows" for any triples where "http://host6/person_spec/knows" is the predicate and "http://host2/people/Alice" is the subject. It should be understood that the syntax of the fifth sub-query is for illustrative purposes only:

Sub-Query 5:

HTTP GET http://host6/person_spec/knows?s=http://host2/people/Alice &p=http://host6/person_spec/knows Furthermore, executor (120) generates and executes one or more sub-queries (process block 220) (which are effectively the same as each other) associated with version 2 of term [3]. Executor (120) sends a sub-query to one or more URLs in version 2 term [3]—in this example, to a URL (namely, "http://host3/people/Bob", which was returned in Working Result 2) associated with the subject and to a URL (namely, "http://host6/person_spec/knows") associated with the predicate.

In the example, an example sixth sub-query below uses the HTTP Protocol to query "http://host3/people/Bob" for any triples where "http://host3/people/Bob" is the subject and "http://host6/person_spec/knows" is the predicate. It should be understood that the syntax of the sixth sub-query is for illustrative purposes only:

Sub-Query 6:

HTTP GET http://host3/people/Bob?p=http://host6/person_spec/knows &s=http://host3/people/Bob In the example, an example seventh sub-query below uses the HTTP Protocol to query "http://host6/person_spec/knows" for any triples where "http://host6/person_spec/knows" is the predicate and "http://host3/people/Bob" is the subject. It should be understood that the syntax of the seventh sub-query is for illustrative purposes only:

Sub-Query 7:

HTTP GET http://host6/person_spec/knows?s=http://host3/people/Bob &p=http://host6/person_spec/knows Furthermore, with reference to Rule 5, the executor (120) ignores term [1] and term [2] as they are now [executed].

In response to execution of the fourth, fifth, sixth and seventh sub-queries, data in the form of triples is returned (see "Data 1", "Data 2" and "Data 3" above) which receiver (125) receives (process block 225):

| Result returned 3: | | |
|---|---|---|
| Subject | Predicate | Object |
| http://host2/people/Alice | http://host6/person_spec/knows | http://host1/people/John |
| http://host2/people/Alice | http://host6/person_spec/knows | http://host4/people/Charles |
| http://host3/people/Bob | http://host6/person_spec/knows | http://host1/people/John |
| http://host3/people/Bob | http://host6/person_spec/knows | http://host5/people/Debbie |

Receiver (125) passes the data to executor (120) which assigns each of the values associated with the "Object" of the returned triples to variable "?p3", giving a working result set as follows:

| Working Result 3: | | |
|---|---|---|
| ?p1 | ?p2 | ?p3 |
| http://host1/people/John | http://host2/people/Alice | http://host1/people/John |
| http://host1/people/John | http://host2/people/Alice | http://host4/people/Charles |
| http://host1/people/John | http://host3/people/Bob | http://host1/people/John |
| http://host1/people/John | http://host3/people/Bob | http://host5/people/Debbie |

In response to executing the fourth, fifth, sixth and seventh sub-queries, executor (120) marks term [3] as [executed].

It should be understood that in the example above, sub-query 5 and sub-query 7 are sent to query "http://host6/person_spec/knows" in order to determine values associated with the same variable, namely, "?p3". Thus, in the example, two separate sub-queries (sub-query 5 and sub-query 7) are sent to the URL "http://host6/person_spec/knows". This approach, which uses HTTP requests, offers significant flexibility, network scalability and ease-of-use in a distributed environment but does require a potentially large number of separate sub-query transmissions.

However, in an alternative embodiment, performance gains can be achieved by a process wherein the separate sub-queries are collated and transmitted in a fewer number of transmissions (e.g. in a single transmission). For example, a single SPARQL query comprising multiple values can be transmitted wherein a SPARQL endpoint is used to execute the SPARQL query (which may be a more complex query). Advantageously, this process helps to reduce network traffic and improve scalability.

With reference to the above, if multiple queries are to be sent a URL in order to determine values associated with different variables, preferably, a means for identifying the variable to which a value is associated with is provided.

As executor (120) determines that there no further terms to be executed (negative result at process block 215) (because terms [1], [2] and [3] as are now all [executed] (see Rule 5)), process block 230, in accordance with Rule 6, executor (120) determines whether an optional clause is present in the query.

In response to an optional clause not being present in the query, the illustrated process is confirmed at process block 245.

In response to an optional clause being present in the query, the optional clause is processed (process block 235). In more detail, an optional clause may comprise one or more terms and a sub-query associated with each term is executed.

The execution of a sub-query associated with an optional clause may or may not use data resulting from sub-query execution associated with the terms.

The result of executing a sub-query associated with an optional clause may or may not result in the return of additional data—in any case, the result of executing a sub-query associated with an optional clause is merged (process block 240) with the most current working result (e.g. merged with the Working Result 3). In response, the illustrated process is confirmed (process block 245).

In accordance with Rule 7, executor (120) determines whether a filter term is present in the query (process block 245).

In response to a filter term not being present in the query, the illustrated process is confirmed (process block 255).

In the example herein, in response to a filter term being present in the query, the executor (120) determines, according to Rule 7, that [f1] can be executed as terms [1], [2] and [3] as are now all [executed] (see Rule 5) and there are no optional clauses (see Rule 6).

In the depicted embodiment, a filter term is executed locally e.g. based on a rule set—a filter term is not executed as a sub-query.

Thus, executor (120) executes the following filter term (process block 250):

FILTER (?p3 !=p1)

With reference to Working Result 3, there are two entries which meet the filter, namely, the entries wherein "http://host1/people/John" is the value for variable "?p1" and for variable "?p3".

Following execution of the filter, the two entries are removed from Working Result 3, giving a resulting working result set as follows:

| Working Result 4: | | |
|---|---|---|
| ?p1 | ?p2 | ?p3 |
| http://host1/people/John | http://host2/people/Alice | http://host4/people/Charles |
| http://host1/people/John | http://host3/people/Bob | http://host5/people/Debbie |

As there are no further sub-clauses to be executed (i.e. there is no sub-clause which is [not_executed]), in accordance with the rules, processing of the entire query completes.

In response, transmitter (115) returns (process block 255) the Working Result 4 to application 150.

Preferably, in environments (e.g. unreliable environments) where data cannot be assumed to be universally stored, it may be beneficial to execute all terms again once an entire query has completed and to repeat this cycle until no new facts are returned. Advantageously, this will enable maximum extraction of data. However, because of the increased cost associated with re-execution of a query, the described process of re-execution is optional.

Preferably, in the case where no component is known for a term that is to be executed (i.e. [three vars]) and no other terms remain that are [not_executed], the term is executed as a standard query against e.g. a local data store for the executing application.

The described embodiment allows for a query to be broken down into constituent terms and subsequently allows for sub-queries associated with the terms to be executed in accordance with one or more rules. A sub-query can be executed against one or more non literal values (URLs) returned in response to a previous sub-query. Advantageously, the described embodiment allows for remote execution of the query even if the data or the data's location is not known by the application which generates the query. Advantageously, this allows for the query to be genuinely distributed.

Methods of various embodiments of the present invention may suitably and usefully be embodied in a logic apparatus, or a plurality of logic apparatus, comprising logic elements arranged to perform the operations of the method and that such logic elements may comprise hardware components, firmware components or a combination thereof.

All or part of a logic arrangement according to embodiments of the present invention may suitably be embodied in a logic apparatus comprising logic elements to perform the operations of such methods, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown) and that the software may be provided in the form of one or more computer program elements carried on any suitable data-carrier (not shown) such as a magnetic or optical disk or the like. Channels for the transmission of data may likewise comprise storage media of all descriptions as well as signal-carrying media, such as wired or wireless signal-carrying media.

Embodiments of the present invention may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions may embody all or part of the functionality previously described herein.

Those skilled in the art will appreciate that such computer readable instructions may be written in any one of a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In an alternative, embodiment of the present invention functionality as described herein may be realized in the form of computer implemented method of deploying a service comprising operations of deploying computer program code operable to, when deployed into a computer infrastructure and executed thereon, cause a computer system to perform all the operations of the described method.

It will be clear to one skilled in the art that many improvements and modifications can be made to the foregoing illustrative embodiment without departing from the scope of the present invention.

The invention claimed is:

1. A method for distributing a query, wherein the query comprises a plurality of sub-clauses, wherein each sub-clause comprises a triple pattern having three components for use with a distributed system, the method comprising:
   identifying each sub-clause;
   analysing three components of each sub-clause in accordance with analysis rules in order to determine a proportion of values to variables in each of the sub-clause;
   in response to the determination of the proportions of values to variables, testing at least one of the plurality of sub-clauses against execution rules based, at least partly, on the proportion of values to variables of the at least one sub-clause, wherein the execution rules define an order of processing of a sub-clause based on a proportion of values to variables; and
   in response to the testing, generating a sub-query based on a first sub-clause of the plurality of sub-clauses having the largest of the proportions of values to variables.

2. The method of claim 1, wherein the sub-query is associated with determining a value associated with a variable in the first sub-clause.

3. The method of claim 2, further comprising:
   analysing each of three components associated with the first sub-clause in order to determine whether at least one of the components is associated with a first non-literal value; and
   in response to determining that at least one of the components is associated with a first non-literal value, using the first non-literal value in the sub-query.

4. The method of claim 3, wherein the first non-literal value comprises a first location and the method further comprises:
   transmitting the sub-query to the first location.

5. The method of claim 3, further comprising:
   in response to transmitting the sub-query, receiving a result comprising at least one value.

6. The method of claim 5, wherein the result comprises a second value associated with a second variable in the first sub-clause.

7. The method of claim 6, wherein the second value is a second non-literal value.

8. The method of claim 7, wherein the second non-literal value is associated with a second location.

9. The method of claim 8, further comprising:
   repeating each of the analysing each sub-clause and testing steps for at least one another clause of the one or more remaining sub-clauses.

10. The method of claim 9, further comprising:
    generating a sub-query associated with a second sub-clause having the largest proportion of values to variables of said remaining sub-clauses.

11. The method of claim 10, further comprising:
    using the second non-literal value in the sub-query associated with the second sub-clause.

12. The method of claim 11, wherein the result further comprises a third value associated with a second variable in the first sub-clause.

13. The method of claim 12, wherein the third value is a third non-literal value.

14. The method of claim 13, further comprising:
    using the third non-literal value in the sub-query associated with the second sub-clause.

15. An apparatus for distributing a query, wherein the query comprises a plurality of sub-clauses, wherein each sub-clause comprises a triple pattern having three components for use with a distributed system, the apparatus comprising:
    a processor;
    a non-transitory, computer readable storage medium having program instructions stored thereon, the program instruction configured to,
    identify each sub-clause;
    analysing three components of each sub-clause in accordance with analysis rules in order to determine a proportion of values to variables in each of the sub-clauses;
    responsive to the determination of proportions of values to variables, test at least one of the plurality of sub-clauses against execution rules based, at least partly, on the proportion of values to variables of the at least one sub-clause, wherein the execution rules define an order of processing of a sub-clause based on a proportion of values to variables; and responsive to testing of at least one of the plurality of sub-clauses against the execution rules, generate a sub-query based on a first sub-clause of the plurality of sub-clauses having the largest of proportions of values to variables.

16. The apparatus of claim 15, wherein the sub-query is operable to determine a value associated with a variable in the first sub-clause.

17. The apparatus of claim 16, further comprising program instructions configured to:

analyse each of three components associated with the first sub-clause in order to determine whether at least one of the components is associated with a first non-literal value; and responsive to a determination that at least one of the components is associated with a first non-literal value, use the first non-literal value in the sub-query.

18. The apparatus of claim 17, wherein the first non-literal value comprises a first location and the apparatus further comprises program instructions configured to:

transmit the sub-query to the first location.

19. The apparatus of claim 17, further comprising program instructions configured to:

responsive to transmission of the sub-query, receive a result comprising at least one value.

20. The apparatus of claim 19, wherein the result comprises a second value associated with a second variable in the first sub-clause.

21. The apparatus of claim 20, wherein the second value is a second non-literal value.

22. The apparatus of claim 20, wherein the second value is a second non-literal value.

23. The apparatus of claim 22, further comprising program instructions configured to:

repeating each of the analysing each sub-clause and testing for at least one another clause of the one or more remaining sub-clauses.

24. The apparatus of claim 23, further comprising program instructions configured to:

generate a sub-query associated with a second sub-clause having the largest proportion of values to variables of said remaining sub-clauses.

25. The apparatus of claim 24, further comprising program instructions configured to:

use the second non-literal value in the sub-query associated with the second sub-clause.

26. The apparatus of claim 25, wherein the result further comprises a third value associated with a second variable in the first sub-clause.

27. The apparatus of claim 26, wherein the third value is a third non-literal value.

28. A computer program product for distributing a query, wherein the query comprises a plurality of sub-clauses, wherein each sub-clause comprises a triple pattern having three components for use with a distributed system, the computer program product comprising:

a non-transitory, machine-readable storage medium having program instructions stored thereon, the program instructions configured to:

identify each sub-clause;

analyse three components of each sub-clause in accordance with analysis rules in order to determine a proportion of values to variables in each of the sub-clauses;

in response to the determination of the proportions of values to variables, test at least one of the plurality of sub-clauses against execution rules based, at least partly, on the proportion of values to variables of the at least one sub-clause, wherein the execution rules define an order of processing of a sub-clause based on a proportion of values to variables; and in response to testing, generate a sub-query based on a first sub-clause of the plurality of sub-clauses having the largest of the proportions of values to variables.

29. The method of claim 1 further comprising:

in response to executing the sub-query generated based on the first sub-clause, marking the first sub-clause as executed;

updating those of the plurality of sub-clauses that are not marked as executed with a result provided in response to executing the sub-query;

analysing each of the updated ones of the plurality of sub-clauses that are not marked as executed, wherein said analyzing is in accordance with the analysis rules to determine the second proportions of values to variables;

testing at least one of the updated ones of the plurality of sub-clauses that are not marked as executed against the execution rules based on the second proportions of values to variables; and generating a second sub-query based on a second sub-clause of the updated ones of the plurality of sub-clauses having the largest of the proportions of values to variables.

* * * * *